United States Patent
Shiau et al.

(10) Patent No.: US 8,466,999 B2
(45) Date of Patent: Jun. 18, 2013

(54) DISPLAY HAVING IMAGE CAPTURE APPARATUS

(75) Inventors: Yi-Hau Shiau, Taichung County (TW); Wen-Chang Hsieh, Tainan County (TW)

(73) Assignee: Au Optronics Corporation, Hsinchu (TW)

( * ) Notice: Subject to any disclaimer, the term of this patent is extended or adjusted under 35 U.S.C. 154(b) by 294 days.

(21) Appl. No.: 12/970,973

(22) Filed: Dec. 17, 2010

(65) Prior Publication Data
US 2012/0069241 A1    Mar. 22, 2012

(30) Foreign Application Priority Data
Sep. 17, 2010   (TW) ................................ 99131623 A (51) Int. Cl.
*H04N 5/225* (2006.01)
(52) U.S. Cl.
USPC ...................... 348/373; 348/333.01
(58) Field of Classification Search
USPC .................. 348/207.1, 373, 333.01
See application file for complete search history.

(56) References Cited

U.S. PATENT DOCUMENTS

| 7,324,152 B2 * | 1/2008 | Yoon ............................. 348/360 |
| 7,611,294 B2 * | 11/2009 | Shi et al. .................... 348/207.1 |
| 2007/0018949 A1 * | 1/2007 | Chang et al. .................. 345/156 |
| 2010/0020182 A1 * | 1/2010 | Wang et al. ................ 348/207.1 |

FOREIGN PATENT DOCUMENTS

| CN | 2331009 | 7/1999 |
| CN | 101666924 | 3/2010 |
| TW | I239418 | 9/2005 |
| TW | I287681 | 10/2007 |

OTHER PUBLICATIONS

"First Office Action of China Counterpart Application", issued on Aug. 1, 2011, p. 1-p. 3.

* cited by examiner

*Primary Examiner* — Gevell Selby
(74) *Attorney, Agent, or Firm* — Jianq Chyun IP Office (57) ABSTRACT

A display includes a display panel and an image capture apparatus. The display panel has a display region, a peripheral region surrounding the display region, and a through hole located in the peripheral region. The image capture apparatus is assembled to the display panel. The image capture apparatus includes a signal transmission device and an image capture device located in the through hole, and the image capture device is connected to the signal transmission device.

13 Claims, 10 Drawing Sheets

DISPLAY HAVING IMAGE CAPTURE APPARATUS

CROSS-REFERENCE TO RELATED APPLICATION

This application claims the priority benefit of Taiwan application serial no. 99131623, filed on Sep. 17, 2010. The entirety of the above-mentioned patent application is hereby incorporated by reference herein and made a part of this specification.

BACKGROUND OF THE INVENTION

1. Field of the Invention

The invention relates to a display. More particularly, the invention relates to a display having an image capture apparatus.

2. Description of Related Art

With the development of information, electronic information equipment, such as notebook computers, desktop computers, displays, and televisions, have become one of the indispensable electronic products in our daily lives. As the science and technology advanced, the technique of integrating an image capture apparatus into a display panel of the aforesaid electronic information equipment tends to be mature. The image capture apparatus allows a user to interact with other users at a remote end or record personal audio and video files.

Figure 1:
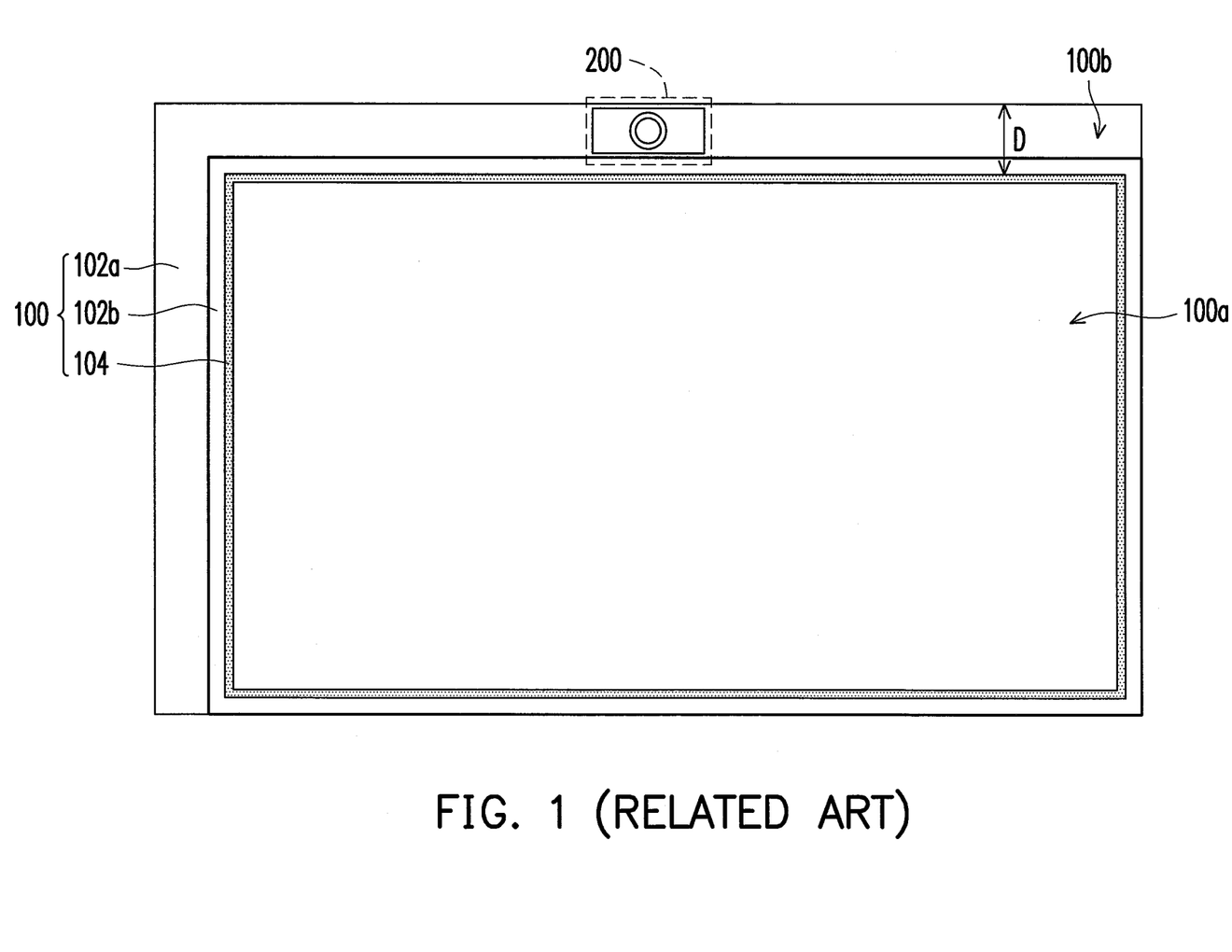
FIG. 1 is a schematic top view illustrating a display panel of a conventional notebook computer.

FIG. 1 is a schematic top view illustrating a conventional display panel. With reference to FIG. 1, the display panel 100 includes a first substrate 102a, a second substrate 102b, and a sealant 104 between the first substrate 102a and the second substrate 102b. In the display panel 100, a display region 100a can actually display images, and the display region 100a is surrounded by a peripheral region 100b. Generally, the image capture apparatus 200 is disposed on the peripheral region 100b, as indicated in FIG. 1.

However, the increasing demand for the look of the display panel 100 results in the reduced width D of the peripheral region 100b of the display panel 100, and thus it is more difficult to place the image capture apparatus 200 in the peripheral region 100b of the display panel 100. Hence, how to place the existing image capture apparatus 200 in the peripheral region 100b with the reduced width D in order to form the display panel 100 having slim borders and the image capture apparatus 200 becomes an important issue to be resolved immediately.

SUMMARY OF THE INVENTION

The invention is directed to a display that has a through hole to accommodate an image capture apparatus.

The invention provides a display that includes a display panel and an image capture apparatus. The display panel has a display region, a peripheral region surrounding the display region, and a through hole located in the peripheral region. The image capture apparatus is assembled to the display panel. The image capture apparatus includes a signal transmission device and an image capture device located in the through hole, and the image capture device is connected to the signal transmission device.

According to an embodiment of the invention, the display panel includes a first substrate, a second substrate, a sealant, and a display medium. The second substrate is located above the first substrate. The sealant is disposed between the first substrate and the second substrate and located in the peripheral region. The display medium is disposed between the first substrate and the second substrate and surrounded by the sealant.

According to an embodiment of the invention, the sealant has a deflection portion around the through hole. The deflection portion makes the through hole be located outside a surrounding range of the sealant.

According to an embodiment of the invention, the deflection portion has a V-shaped pattern or a U-shaped pattern.

According to an embodiment of the invention, the sealant has a ring-like pattern around the through hole, and the ring-like pattern surrounds the through hole.

According to an embodiment of the invention, an inner edge of the ring-like pattern is substantially aligned to a sidewall of the through hole.

According to an embodiment of the invention, a gap is between the inner edge of the ring-like pattern and the sidewall of the through hole.

According to an embodiment of the invention, an outer edge of the ring-like pattern has a circular shape or an elliptical shape.

According to an embodiment of the invention, the through hole is located in the first substrate.

According to an embodiment of the invention, the through hole is located in the second substrate.

According to an embodiment of the invention, the through hole is located in the first substrate and the second substrate simultaneously.

According to an embodiment of the invention, the display panel has a plurality of fan-out wirings located in the peripheral region, and the through hole is located between any two of the fan-out wirings adjacent to each other.

According to an embodiment of the invention, the through hole extends from an edge of the display panel to the display region.

According to an embodiment of the invention, a minimum distance from a sidewall of the through hole to an edge of the display panel is greater than 0.

According to an embodiment of the invention, the display panel has at least one alignment mark located in the peripheral region, and the alignment mark is adjacent to the through hole.

In the invention, the image capture apparatus and the display panel having a narrow peripheral region are assembled together through the through hole in the display region. The sealant is coated in a special manner, such that the sealant is not cut off by the through hole. Thereby, the display medium is not leaked, and the display medium can be protected from environmental contamination.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

Figure 2A:
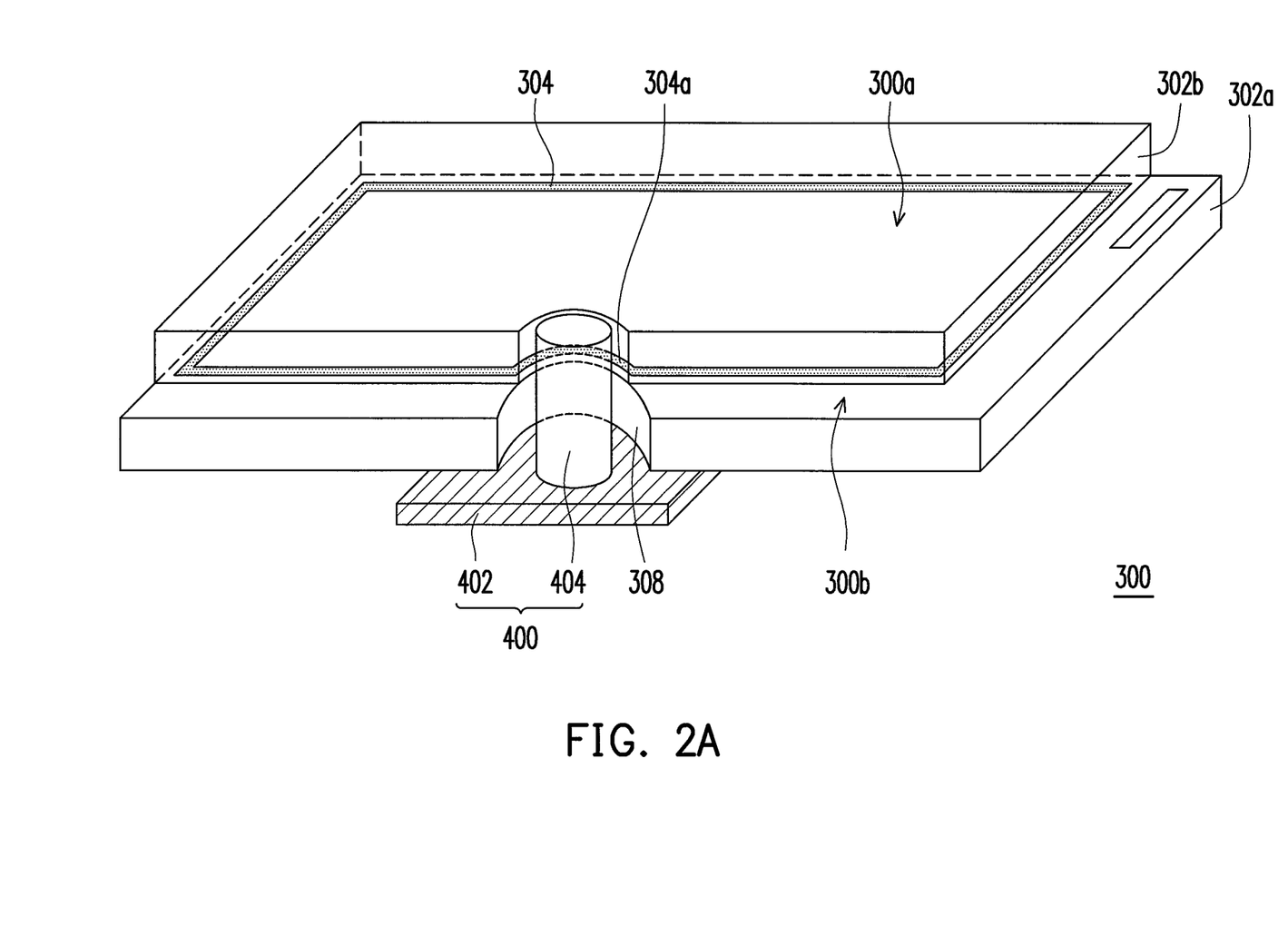
FIG. 2A is a schematic three-dimensional view illustrating a display according to an embodiment of the invention.
Figure 2B:
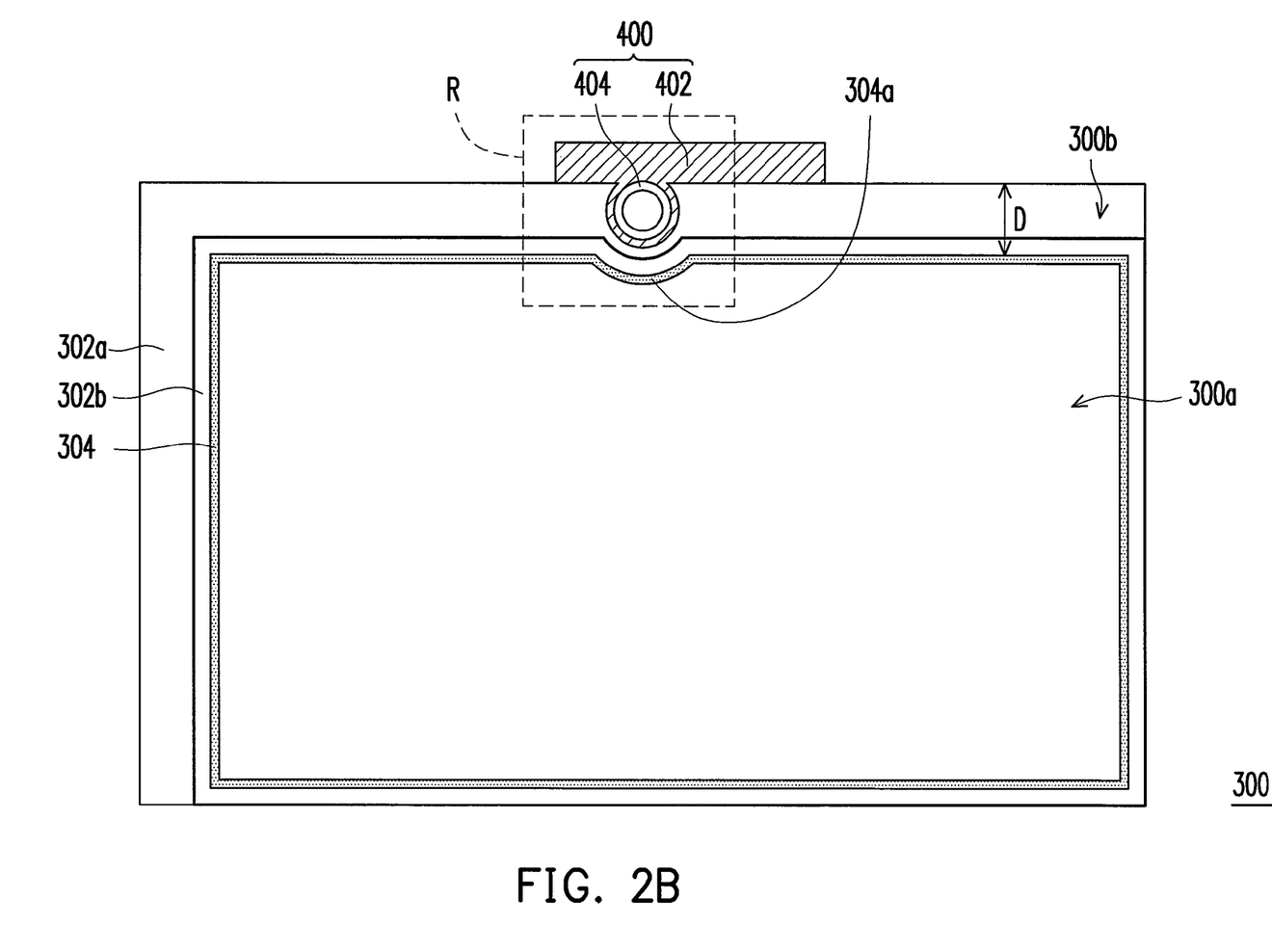
FIG. 2B is a schematic top view of FIG. 2A.

FIG. 2A is a schematic three-dimensional view illustrating a display according to an embodiment of the invention. FIG. 2B is a schematic top view of FIG. 2A. FIG. 3, FIG. 4A to FIG. 4J, and FIG. 5 are schematic top views illustrating a partial region R of FIG. 2B.

With reference to FIG. 2A, the display of this embodiment includes a display panel 300 and an image capture apparatus 400. The display panel 300 includes a first substrate 302a, a second substrate 302b, a sealant 304, and a display medium (not shown).

In this embodiment, the first substrate 302a is an active device array substrate, for instance. Specifically, the first substrate 302a is, for instance, a thin film transistor (TFT) array substrate on which a plurality of scan lines (not shown), a plurality of data lines (not shown), a plurality of TFTs, and a plurality of pixel units are formed. The scan lines and the data lines are intersected. The TFTs are electrically connected to the corresponding scan lines and the corresponding data lines. The pixel units are electrically connected to the corresponding TFTs. However, the invention is not limited thereto. The first substrate 302a of this embodiment can also refer to other types of array substrates, e.g., a color filter on array (COA) substrate, an array on color filter (AOC) substrate, and so on.

The second substrate 302b of this embodiment is disposed above the first substrate 302a, and the second substrate 302b is a color filter array substrate, for instance. Particularly, a black matrix, a plurality of color filter films (not shown) in different colors, and a common electrode are disposed on the color filter array substrate. However, the invention is not limited thereto. The second substrate 302b can also be an array substrate that does not have the black matrix and the color filter films. In most cases, when the first substrate 302a is the COA substrate or the AOC substrate, the second substrate 302b can be the array substrate having no color filter film; when the first substrate 302a is a normal TFT array substrate, the second substrate 302b can be the array substrate having the color filter films and/or the black matrix.

In this embodiment, the display panel 300 has a display region 300a that actually displays images and a peripheral region 300b located outside the display region 300a. The sealant 304 is disposed between the first substrate 302a and the second substrate 302b and located in the peripheral region 300b. Besides, the sealant 304 is used to bond the first substrate 302a to the second substrate 302b, and thereby a cell gap between the first substrate 302a and the second substrate 302b remains unchanged. For instance, the sealant 304 can be a thermal-curable sealing material, a photo-curable sealing material, a hybrid sealing material, or any other appropriate sealing material.

The display medium (not shown) is located between the first substrate 302a and the second substrate 302b and surrounded by the sealant 304. In this embodiment, the display medium serves as a photo valve and can be liquid crystal (e.g., nematic liquid crystal, cholesteric liquid crystal, or smectic liquid crystal), an organic electroluminescent device layer, an electrophoretic display medium, or any other appropriate display medium.

Figure 3:
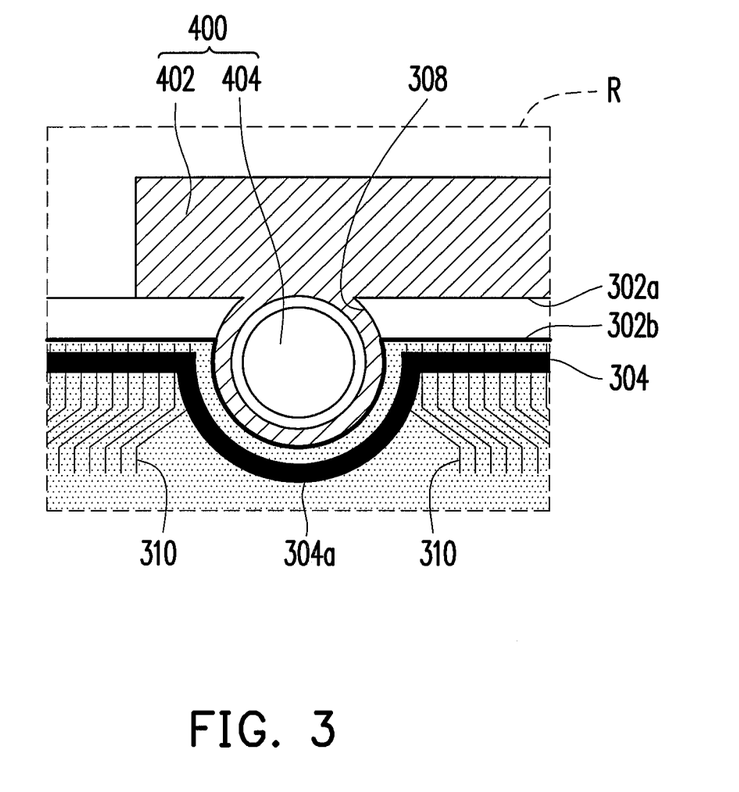
FIG. 3, FIG. 4A to FIG. 4J, and FIG. 5 are schematic top views illustrating a partial region in a display according to an embodiment of the invention.
Figure 4A:
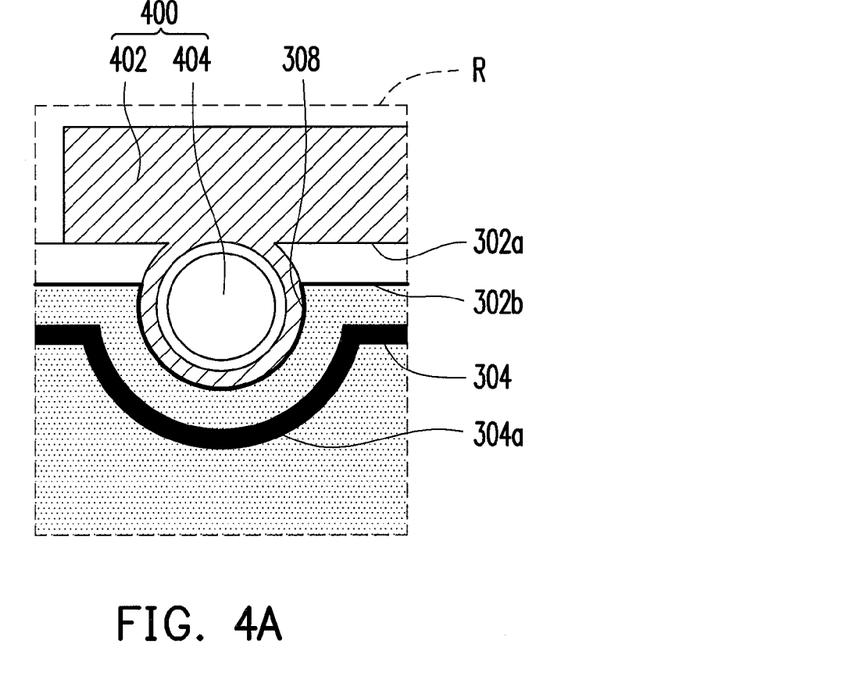
Figure 4B:
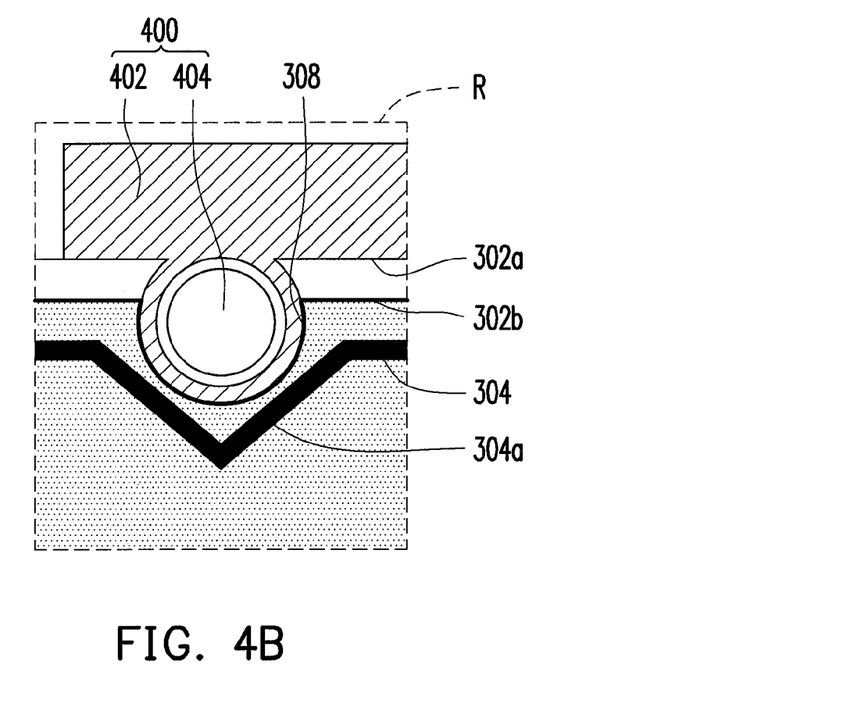
Figure 4C:
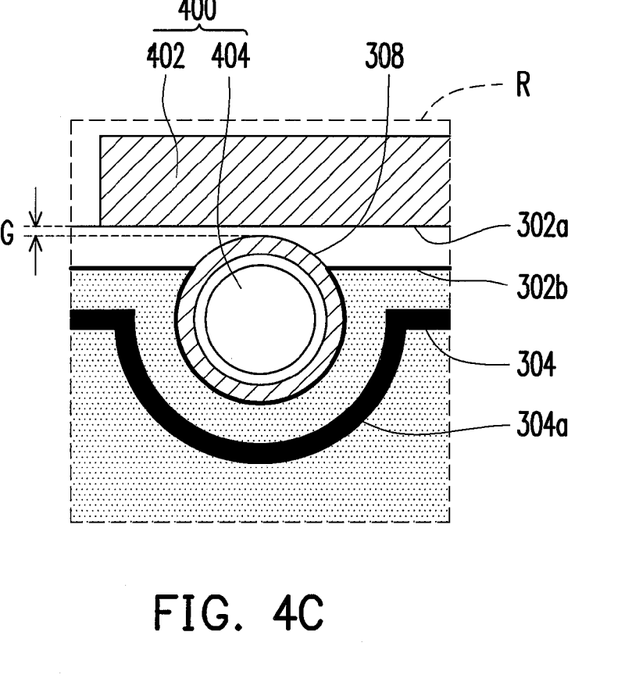
Figure 4D:
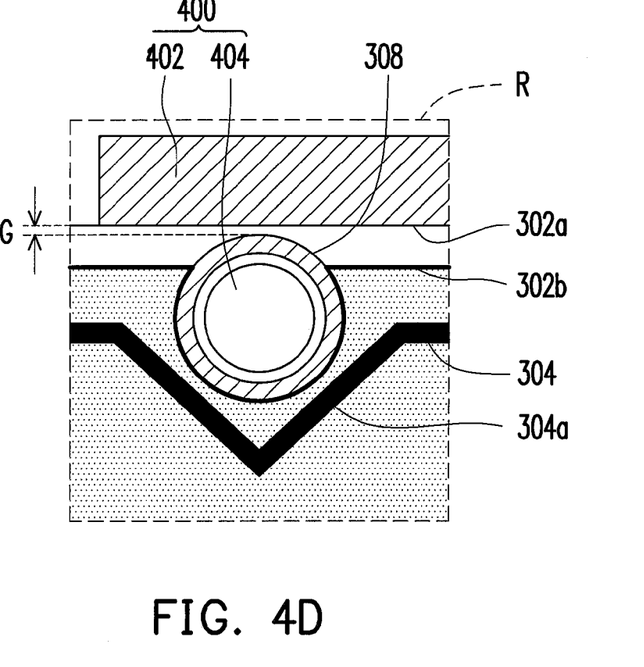

The display panel 300 of this embodiment has a through hole 308 located in the peripheral region 300b, and the through hole 308 extends from an edge of the display panel 300 to the display region 300a. In order not to affect normal operation of the display panel 300, the through hole 308 is often formed between any two adjacent fan-out wirings 310, as shown in FIG. 3, for instance. According to this embodiment, the through hole 308 is on both the first substrate 302a and the second substrate 302b, and an area occupied by the through hole 308 on the first substrate 302a is greater than an area occupied by the through hole 308 on the second substrate 302b, as indicated in FIG. 2B, FIG. 4A, and FIG. 4B. In other words, the through hole 308 is open-ended shape, and the edge of the through hole 308 is individually linked together the edge of the first substrate 302a and the edge of the second substrate 302b. However, the invention is not limited thereto. According to other embodiments, the minimum distance G from a sidewall of the through hole 308 to an edge of the display panel 300 can be greater than 0, as shown in FIG. 4C to FIG. 4J. That is to say, the through hole 308 is a close-ended through hole that has a circular shape, an elliptical shape, or a polygonal shape. The area occupied by the through hole 308 on the first substrate 302a and the area occupied by the through hole 308 on the second substrate 302b can be the same (as shown in FIG. 4E to FIG. 4J) or different (as shown in FIG. 4C and FIG. 4D).

It is noted that the through hole 308 is located in the first substrate 302a, located in the second substrate 302b or simultaneously located in the first substrate 302a and the second substrate 302b.

Note that the sealant 304 is not cut off by the through hole 308 in this embodiment. To be more specific, the sealant 304 of this embodiment can have a deflection portion 304a around the through hole 308 to restrict the location where the through hole 308 is formed. Since the deflection portion 304a makes the through hole 308 be located outside a surrounding range of the sealant 304, the sealant 304 is not cut off by the through hole 308.

Figure 4E:
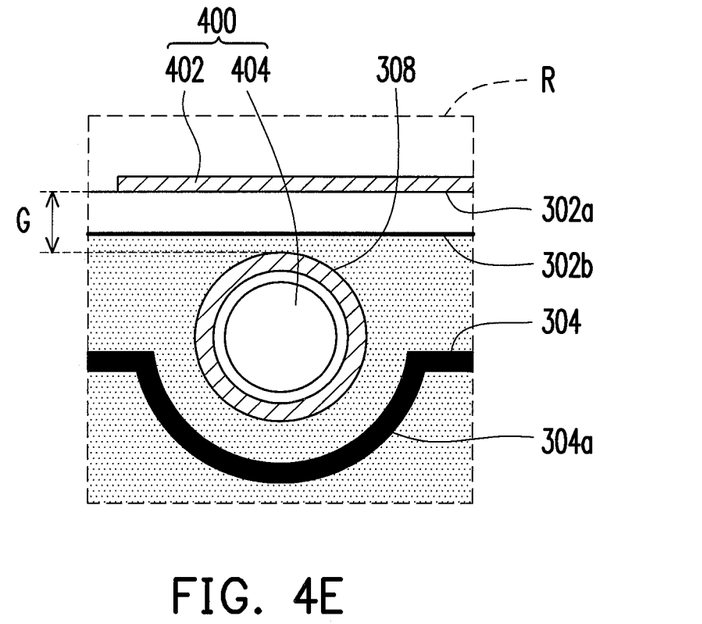
Figure 4F:
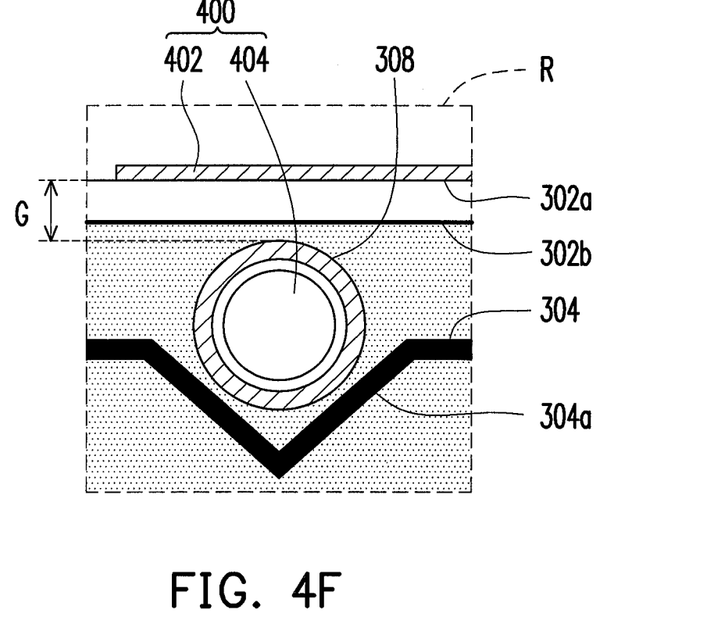

For example, the deflection portion 304a of this embodiment has a U-shaped pattern that allows the through hole 308 to be located outside the surrounding range of the sealant 304. Meanwhile, the U-shaped pattern ensures that the sealant 304 is not cut off by the through hole 308, as shown in FIG. 2B and FIG. 4A. Certainly, the deflection portion 304a having the U-shaped pattern can also be applied in other feasible embodiments of the invention, as indicated in FIG. 4C and FIG. 4E. However, the invention is not limited thereto. In other embodiments of the invention, the deflection portion 304a can have other appropriate shapes, such as a V-shaped pattern, as indicated in FIG. 4B, FIG. 4D, and FIG. 4F.

In addition, when the minimum distance G from the sidewall of the through hole 308 to the edge of the display panel 300 is greater than 0 according to other embodiments of the invention, the sealant 304 can have a ring-like pattern around the through hole 308, and the ring-like pattern surrounds the through hole 308. To be more specific, the ring-like pattern is a circular pattern or an elliptical pattern, for instance. However, the invention is not limited thereto. The ring-like pattern can be in other appropriate shapes based on actual requirements.

Figure 4G:
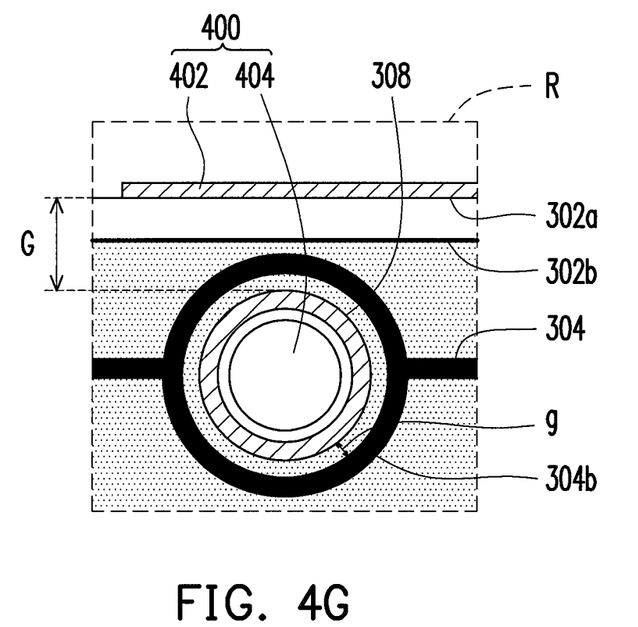
Figure 4H:
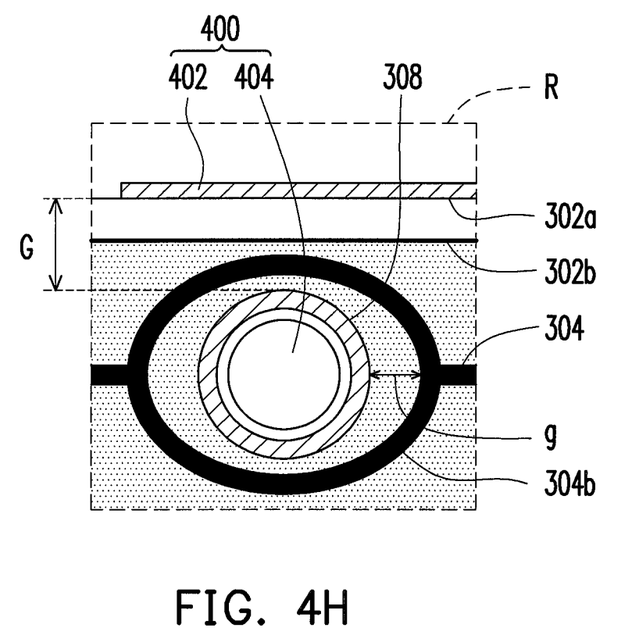

It should be mentioned that a gap g can exist between an inner edge of the ring-like pattern 304b to the sidewall of the through hole 308, as shown in FIG. 4G and FIG. 4H. The gap g results in an increase in the process window when the through hole 308 is formed. For instance, when the through hole 308 is formed by laser cutting, the ring-like pattern 304b is less likely to be damaged by laser or cutting tools if the gap g exists between the inner edge of the ring-like pattern 304b and the sidewall of the through hole 308, and thereby defects occurring in the first substrate 302a and the second substrate 302b can be better prevented.

Figure 4I:
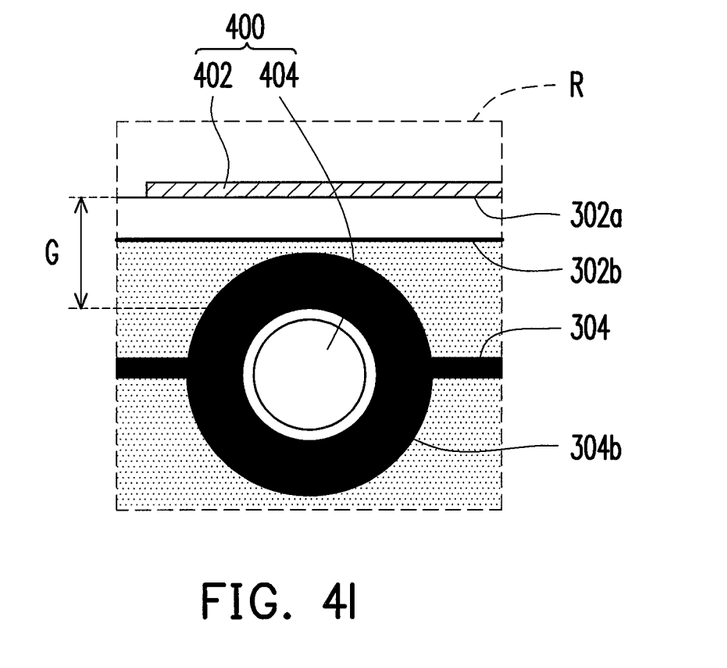
Figure 4J:
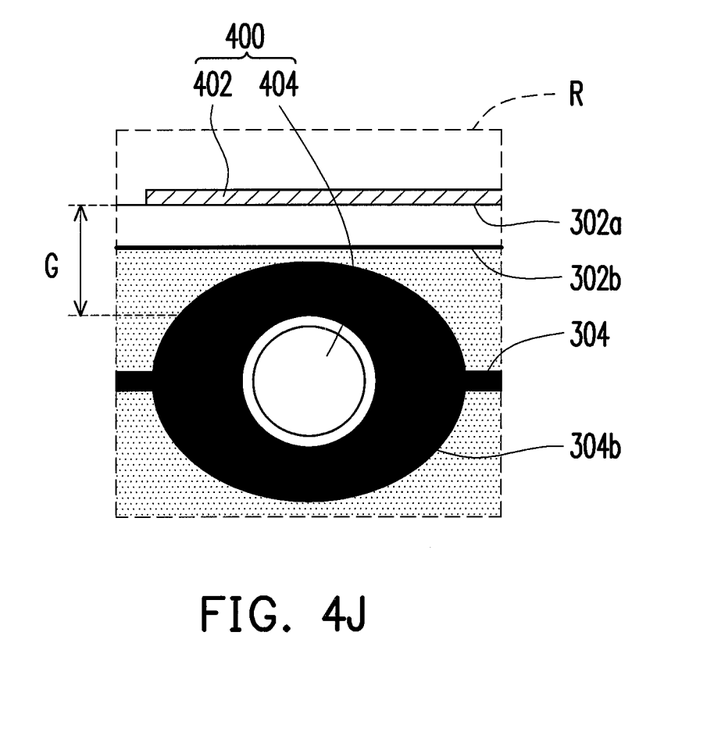

However, the speed of coating the sealant 304 can be appropriately adjusted, such that the sealant 304 can have a relatively large width at the location where the through hole 308 is to be formed. The through hole 308 penetrating the first substrate 302a, the second substrate 302b, and the sealant 304 is then formed by laser cutting or mechanical cutting. At this time, the inner edge of the ring-like pattern 304b is substantially aligned to the sidewall of the through hole 308, as indicated in FIG. 4J and FIG. 4I. In the other words, the embodiment of the invention, there is substantially no gap existing between the inner edge of the ring-like pattern 304b and the sidewall of the through hole 308.

Figure 5:
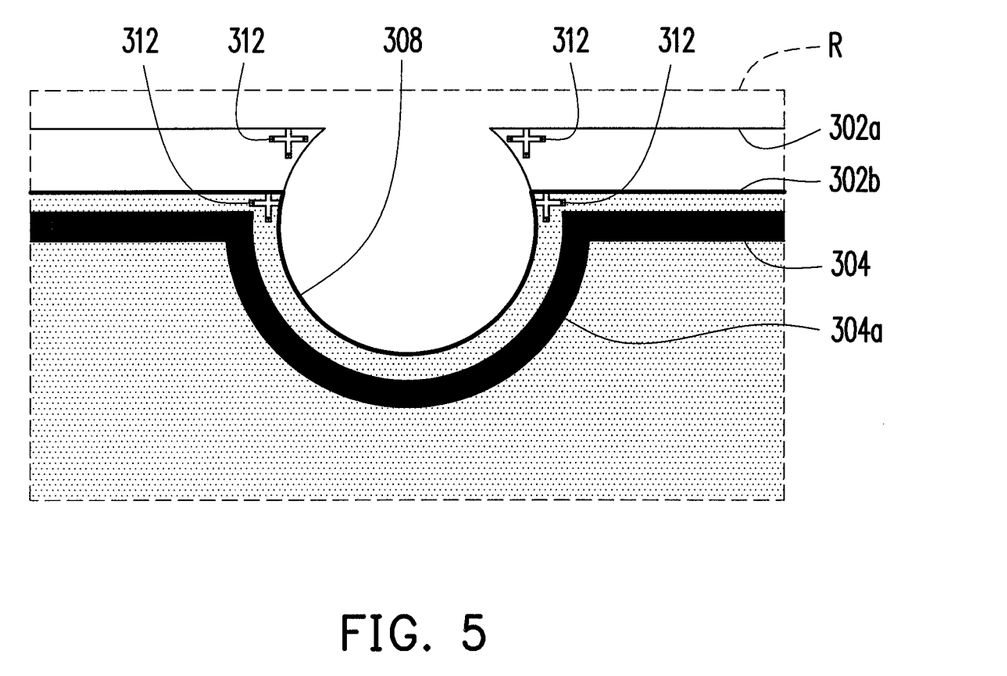

As shown in FIG. 5, in order to accurately control the location where the through hole 308 is formed, the display panel 300 of this embodiment can selectively have at least one alignment mark 312 that is located in the peripheral region 300b and adjacent to where the through hole 308 is to be formed. It can be learned from FIG. 5 that the alignment mark 312 is conducive to the alignment process of the cutting machine, such that the through hole 308 can be formed at the correct location by the cutting machine.

The image capture apparatus 400 of this embodiment includes a signal transmission device 402 and an image capture device 404, and the image capture device 404 is connected to the signal transmission device 402. According to this embodiment, the image capture device 404 is located in the through hole 308 that is formed in the peripheral region 300b. The signal transmission device 402 of this embodiment can be further fixed to the back side of the display panel 300 through an adhesive (e.g., a double-sided tape).

To sum up, the through hole is formed in the peripheral region of the display panel according to this invention, such that the image capture apparatus can be easily placed on the peripheral region with the narrow width, and that the display having the narrow borders and the image capture apparatus can be formed in this invention.

Moreover, in some embodiments of the invention, the specially-coated sealant allows the image capture apparatus to be disposed on the peripheral region in a flexible manner.

It will be apparent to those skilled in the art that various modifications and variations can be made to the invention without departing from the scope or spirit of the invention. In view of the foregoing, it is intended that the invention cover modifications and variations of this invention provided they fall within the scope of the following claims and their equivalents.

What is claimed is:

1. A display comprising:
   a display panel having a display region, a peripheral region surrounding the display region, and a through hole located in the peripheral region; and
   an image capture apparatus assembled to the display panel, the image capture apparatus comprising a signal transmission device and an image capture device located in the through hole, and the image capture device being connected to the signal transmission device, wherein the display panel comprises:
   a first substrate;
   a second substrate disposed above the first substrate;
   a sealant disposed between the first substrate and the second substrate and located in the peripheral region, the sealant having a deflection portion around the through hole, wherein the deflection portion makes the through hole be located outside a surrounding range of the sealant; and
   a display medium disposed between the first substrate and the second substrate and surrounded by the sealant.

2. The display as claimed in claim 1, wherein the deflection portion has a V-shaped pattern or a U-shaped pattern.

3. The display as claimed in claim 1, wherein the sealant has a ring-like pattern around the through hole, and the ring-like pattern surrounds the through hole.

4. The display as claimed in claim 1, wherein an inner edge of the ring-like pattern is substantially aligned to a sidewall of the through hole.

5. The display as claimed in claim 4, wherein a gap is between the inner edge of the ring-like pattern and the sidewall of the through hole.

6. The display as claimed in claim 4, wherein an outer edge of the ring-like pattern has a circular shape or an elliptical shape.

7. The display as claimed in claim 1, wherein the through hole is located in the first substrate.

8. The display as claimed in claim 1, wherein the through hole is located in the second substrate.

9. The display as claimed in claim 1, wherein the through hole is located in the first substrate and the second substrate.

10. The display as claimed in claim 1, wherein the display panel has a plurality of fan-out wirings located in the peripheral region, and the through hole is located between any two of the fan-out wirings adjacent to each other.

11. The display as claimed in claim 1, wherein the through hole extends from an edge of the display panel to the display region.

12. The display as claimed in claim 1, wherein a minimum distance from a sidewall of the through hole to an edge of the display panel is greater than 0.

13. The display as claimed in claim 1, wherein the display panel has at least one alignment mark located in the peripheral region, the at least one alignment mark being adjacent to the through hole.

* * * * *